(12) United States Patent
Sugimoto et al.

(10) Patent No.: US 8,814,257 B2
(45) Date of Patent: Aug. 26, 2014

(54) VEHICLE ROOF DEVICE

(71) Applicant: Yachiyo Industry Co., Ltd., Sayama (JP)

(72) Inventors: Kazutaka Sugimoto, Tochigi-ken (JP); Ryosuke Noro, Sakura (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 13/778,381

(22) Filed: Feb. 27, 2013

(65) Prior Publication Data
US 2013/0257108 A1    Oct. 3, 2013

(30) Foreign Application Priority Data

Apr. 2, 2012 (JP) ................................. 2012-083522

(51) Int. Cl.
B60J 3/02 (2006.01)
B60J 7/05 (2006.01)
B60J 7/057 (2006.01)
B60J 7/00 (2006.01)

(52) U.S. Cl.
CPC .............. B60J 7/0007 (2013.01); B60J 7/0573 (2013.01)
USPC ............ 296/214; 296/221; 296/222; 296/223

(58) Field of Classification Search
CPC .......................... B60J 7/0573; H01H 2300/006
USPC ................................... 296/214, 221, 222, 223
See application file for complete search history.

(56) References Cited

U.S. PATENT DOCUMENTS 4,476,416 A * 10/1984 Licata et al. .................. 318/283
4,741,573 A *  5/1988 Yokota .......................... 296/221
5,791,204 A *  8/1998 Torii et al. .................... 74/606 R

FOREIGN PATENT DOCUMENTS

| DE | 19812630 B4 | 3/2008 |
| JP | 4293617 A | 10/1992 |
| JP | 11268540 A | 10/1999 |

* cited by examiner

Primary Examiner — Dennis H Pedder
(74) Attorney, Agent, or Firm — Dority & Manning, PA

(57) ABSTRACT

In a vehicle roof device equipped with a sunroof member and a sunshade member driven by respective electric motors, an operation switch includes an operation member to be operated by a vehicle occupant, the operation member being movable between a neutral position, an opening operation position and a closing operation position, where the opening and closing operation positions are displaced from the neutral position in different directions. The vehicle roof device further includes a control unit configured which, when the operation member is moved to one of the opening and closing operation positions, controls the electric motors so as to drive the sunroof member and the sunshade member in an operation mode determined based on a relationship of a duration of the operation member held at the one of the opening operation position and the closing operation position with two different threshold time periods.

10 Claims, 9 Drawing Sheets

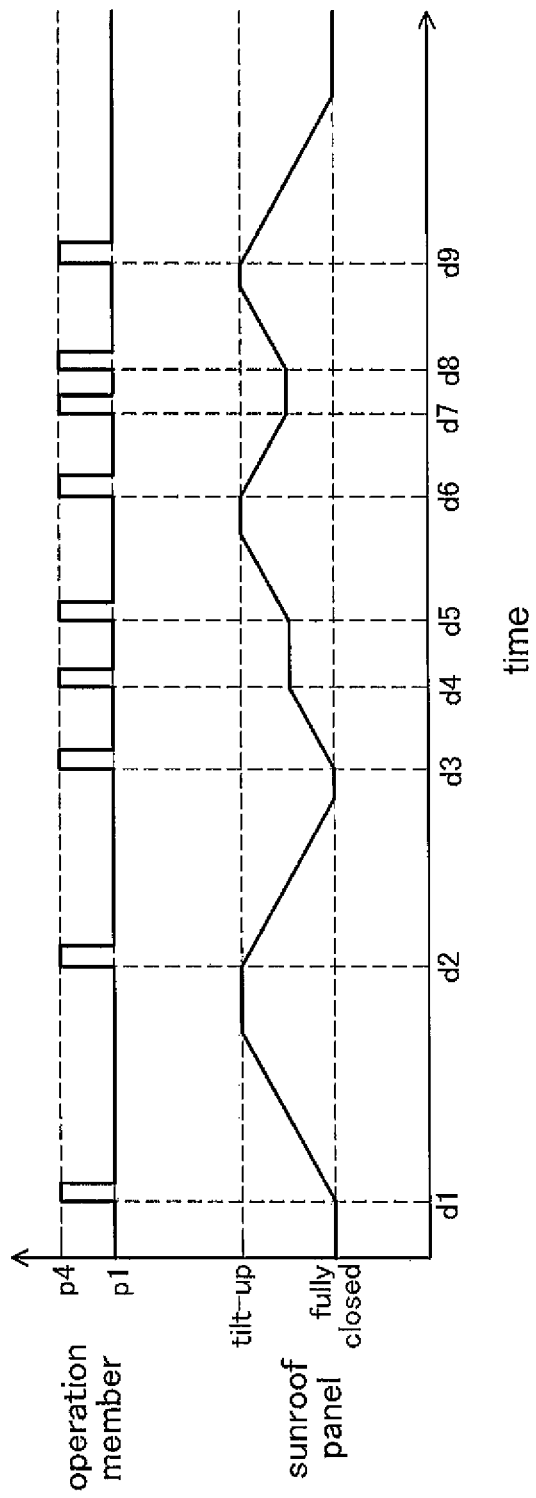

VEHICLE ROOF DEVICE

TECHNICAL FIELD

The present invention relates to a vehicle roof device equipped with a sunroof member and a sunshade member for selectively opening and closing an opening formed in the roof of a vehicle and a control unit for controlling the movement of the sunroof member and the sunshade member in response to an operation performed by a vehicle occupant on an operation switch.

BACKGROUND OF THE INVENTION

Some motor vehicles are fitted with a sunroof system including a sunroof panel that can be slidably moved to selectively open an opening formed in the roof of the vehicle for allowing light to enter the passenger compartment or for ventilation. Such a sunroof panel is often made of a transparent panel such as a glass panel. The sunroof brightens the interior of the vehicle and provides a sense of openness on the one hand, but may excessively brighten or warm the interior of the vehicle. To control the excessive admission of sunlight, a panel-shaped or sheet-shaped sunshade may be provided under the sunroof panel so as to be moveable between an open position for admitting the sunlight and a closed position for blocking the sunlight.

In the vehicle roof equipped with a sunroof panel and a sunshade each moveable to expose and close the roof opening, it may be desirable that the sunroof panel and the sunshade can be driven electrically. To enable the sunroof panel and the sunshade to be driven electrically, it may be conceived to provide two sets of an electric drive unit and an operation switch, one set for the sunroof panel and the other set for the sunshade. In such a case, however, individual operations of the drive units for the sunroof panel and the sunshade may result in an unfavorable situation in which the sunroof panel is open when the sunshade is closed. To prevent such a situation from occurring, it has been proposed to provide a vehicle roof device including a control circuit for interrelating the operations of the drive units for the sunroof panel and the sunshade with each other (see JP4-293617A, for example).

Further, with regard to the vehicle roof equipped with an electrically driven sunroof panel and an electrically driven sunshade, it has been proposed to use a single operation switch (switch console) to control both the sunroof panel and the sunshade (see JP11-268540A, for example). Specifically, the operation switch disclosed in JP11-268540A includes an operation member configured to be slidable from a neutral position in opposite directions, and defines two slide positions (switching positions) of the operation member in each direction, so that there are four switching positions defined in total. Of the four switching positions, a pair of inner switching positions are associated with the opening and closing of the sunshade, respectively, while a pair of outer switching positions are associated with the opening and closing of the sunroof panel (cover), respectively. Namely, when the operation member is moved to one of the inner switching positions, a control circuit controls a drive unit for the sunshade to move the sunshade to an open position, and when the operation member is moved to the other of the inner switching positions, the control circuit controls the drive unit to move the sunshade to a closed position. Similarly, when the operation member is moved to one of the outer switching positions, the control circuit controls a drive unit for the cover to move the cover to an open position, and when the operation member is moved to the other of the outer switching positions, the control circuit controls the drive unit to move the cover to a closed position. JP11-268540A describes that the control circuit may take into account the time period for which the operation member is positioned at the inner switching positions to determine whether the positioning of the operation member at the inner switching positions is intended by the user or just transitional, resulting from movement of the operation member toward the outer switching positions. It is further described in JP11-268540A that the control circuit may be configured such that when the operation member is moved to one of the outer switching positions to drive the cover, the control circuit may also trigger the movement of the sunshade toward the open position or the closed position depending on the position of the cover or the sunshade. In the vehicle roof device disclosed in JP11-268540A, since a single operation switch is commonly used for controlling the operations of the cover (sunroof panel) and the sunshade, an installation space for the switch can be reduced and the vehicle interior can be simplified.

However, in the vehicle roof device disclosed in JP11-268540A, it is necessary to define two switching positions (or operation positions) in each sliding direction of the operation member, and this makes the structure of the operation switch complicated. Further, in a case where a user moves the operation member from the neutral position to one of the outer switching positions in an attempt to operate only the cover (sunroof panel), if the user does not move the operation member fast enough, the control circuit may determine that the operation member has stayed at the inner switching position located on the way from the neutral position to the outer switching position for longer than a predetermined time period, and trigger the movement of the sunshade against the user's intention before the operation member reaches the outer switching position to cause the cover to move. Thus, there is still room for improvement in the operation of the vehicle roof device.

DE 198 12 630 B4 discloses a device for operating a roof element (sunroof panel) and a sliding liner (sunshade) of a vehicle, in which the opening and closing of the roof element and the sliding liner is controlled in response to an operation of a single switching element (operation member) by a user. The switching element disclosed in DE 198 12 630 B4 is movable in first and second directions which are opposite to each other, where the first direction coincides with an opening direction of the roof element and the sliding liner while the second direction coincides with a closing direction of them. In the device disclosed in DE 198 12 630 B4, a first operation of the switching element in the first direction causes the sliding liner to begin moving in the opening direction and a second operation of the switching element in the first direction causes the roof element to begin moving in the opening direction, while a first operation of the switching element in the second direction causes the roof element to begin moving in the closing direction and a second operation of the switching element in the second direction causes the sliding liner to begin moving in the closing direction. In this device, if, during movement of the roof element or the sliding liner triggered by an operation of the switching element in one of the two directions, the switching element is operated in the opposite direction, the movement of the sunroof element or the sliding liner is stopped, so that each of the roof element and the sliding liner can be positioned at a desired position. Further, when the switching element is operated in the first direction twice successively (or "double-clicked") in a state where each of the roof element and the sliding liner closes the roof opening, both the roof element and the sliding liner are caused to begin moving in the opening direction. Similarly, when the switching element is operated in the second direction twice successively in a state where each of the roof element and the sliding liner reveals the roof opening, both the roof element and the sliding liner are caused to begin moving in the closing direction.

In the device disclosed in DE 198 12 630 B4, one of the roof element and the sliding liner is caused to begin moving when the switching element is operated once, and both the roof element and the sliding liner are caused to begin moving when the switching element is operated twice successively. However, the number of selectable operation modes of the roof element and the sliding liner is practically limited in the device of DE 198 12 630 B4 because requiring a user to operate the switching element more than twice successively would considerably reduce the operability of the device.

SUMMARY OF THE INVENTION

In view of the aforementioned problems in the related art, a primary object of the present invention is to provide a vehicle roof device equipped with a sunroof member and a sunshade member, such that the vehicle roof device includes an operation switch having a simple structure and at the same time can provide good operability.

To achieve the aforementioned object, there is provided a vehicle roof device, comprising: a sunroof member driven by a sunroof electric motor to selectively expose and close a roof opening formed in a roof of a vehicle; a sunshade member disposed beneath the sunroof member and driven by a sunshade electric motor to selectively expose and close the roof opening; an operation switch including an operation member configured to be operated by a vehicle occupant, the operation member being movable between a neutral position, an opening operation position displaced from the neutral position in a first direction and a closing operation position displaced from the neutral position in a second direction different from the first direction; and a control unit configured such that, when the operation member is moved to one of the opening operation position and the closing operation position, the control unit controls the electric motors so as to drive the sunroof member and the sunshade member in an operation mode determined based on a relationship of a duration of the operation member held at the one of the opening operation position and the closing operation position with two different threshold time periods.

According to this structure, owing to the two threshold time periods to be compared with the duration of the operation member held at the one of the operation positions to determine the operation mode, the sunroof member and the sunshade member can be driven in at least three different operation modes even if the operation member of the operation switch has only a single operation position in each of the operating directions (first and second directions). Therefore, the structure of the operation switch can be simplified while the operability of the vehicle roof device is improved.

In a preferred embodiment of the present invention, the two threshold time periods include a first predetermined time period and in a case where the operation member has been held at the opening operation position for less than the first predetermined time period, when the sunshade member is not at a fully open position of the sunshade member, the control unit causes the sunshade electric motor to move the sunshade member toward the fully open position thereof only while the operation member is positioned at the opening operation position, and when the sunshade member is at the fully open position thereof, the control unit causes the sunroof electric motor to move the sunroof member toward a fully open position of the sunroof member only while the operation member is positioned at the opening operation position.

According to this structure, the sunshade member is caused to begin moving in the opening direction with a higher priority than the sunroof member. This contributes to avoiding an unfavorable situation where the sunroof member is moved in the opening direction when the sunshade member is at the fully closed position.

Further preferably, the two threshold time periods further include a second predetermined time period longer than the first predetermined time period and in a case where the operation member has been held at the opening operation position for a time period equal to or longer than the first predetermined time period and less than the second predetermined time period, when the sunshade member is not at the fully open position thereof, the control unit causes the sunshade electric motor to move the sunshade member to the fully open position thereof even after the operation member is returned to the neutral position from the opening operation position, and when the sunshade member is at the fully open position thereof, the control unit causes the sunroof electric motor to move the sunroof member to the fully open position of the sunroof member even after the operation member is returned to the neutral position from the opening operation position.

According to this structure, the sunshade member or the sunroof member can be moved to the fully open position automatically depending on the position of the sunshade member. This improves the operability of the vehicle roof device.

Further preferably, in a case where the operation member has been held at the opening operation position for a time period equal to or longer than the second predetermined time period in a state where the sunshade member is not at the fully open position thereof, the control unit causes the sunshade electric motor and the sunroof electric motor to move both the sunshade member and the sunroof member to the respective fully open positions even after the operation member is returned to the neutral position from the opening operation position.

According to this structure, both the sunshade member and the sunroof member can be moved to the respective fully open positions automatically when desired. This also improves the operability of the vehicle roof device.

In a preferred embodiment of the present invention, the two threshold time periods include a third predetermined time period and in a case where the operation member has been held at the closing operation position for less than the third predetermined time period, when the sunroof member is not at a fully closed position of the sunroof member, the control unit causes the sunroof electric motor to move the sunroof member toward the fully closed position thereof only while the operation member is positioned at the closing operation position, and when the sunroof member is at the fully closed position thereof, the control unit causes the sunshade electric motor to move the sunshade member toward a fully closed position of the sunshade member only while the operation member is positioned at the closing operation position.

According to this structure, the sunroof member is caused to begin moving in the closing direction with a higher priority than the sunshade member. This contributes to avoiding an unfavorable situation where the sunroof member is still on the way to the fully closed position when the sunshade member reaches the fully closed position.

Further preferably, the two threshold time periods further include a fourth predetermined time period longer than the third predetermined time period and in a case where the operation member has been held at the closing operation position for a time period equal to or longer than the third predetermined time period and less than the fourth predetermined time period, when the sunroof member is not at the fully closed position thereof, the control unit causes the sunroof electric motor to move the sunroof member to the fully closed position thereof even after the operation member is returned to the neutral position from the closing operation position, and when the sunroof member is at the fully closed position thereof, the control unit causes the sunshade electric motor to move the sunshade member to the fully closed position of the sunshade member even after the operation member is returned to the neutral position from the closing operation position.

According to this structure, the sunshade member or the sunroof member can be moved to the fully closed position automatically depending on the position of the sunroof member. This improves the operability of the vehicle roof device.

Further preferably, in a case where the operation member has been held at the closing operation position for a time period equal to or longer than the fourth predetermined time period in a state where the sunroof member is not at the fully closed position thereof, the control unit causes the sunshade electric motor and the sunroof electric motor to move both the sunshade member and the sunroof member to the respective fully closed positions even after the operation member is returned to the neutral position from the closing operation position.

According to this structure, both the sunshade member and the sunroof member can be moved to the respective fully closed positions automatically when desired. This also improves the operability of the vehicle roof device.

In a preferred embodiment of the present invention, the vehicle roof device further comprises a tilting mechanism for tilting up and down the sunroof member, the operation member further has a tilting operation position displaced from the neutral position in a direction different from the first direction and the second direction, and the control unit is further configured to, when the operation member is moved to the tilting operation position, control the tilting mechanism to tilt up or down the sunroof member depending on a position of the sunroof member in a tilting direction.

According to this structure, a user is allowed to control not only the movement of the sunroof member and the sunshade member in the opening and closing directions, but also the tilting movement of the sunroof member by operating the single operation switch in an intuitive and easy manner, and therefore, the operability of the vehicle roof device can be improved.

In a preferred embodiment, the operation switch is configured to define only a single operation position of the operation member in each of the first and second directions. This allows the structure of the operation switch to be simplified.

In a preferred embodiment, the control unit determines the operation mode based on a position of at least one of the sunroof member and the sunshade member in addition to the relationship of the duration of the operation member held at the one of the opening operation position and the closing operation position with the two different threshold time periods. This can increase the number of operation modes selectable even further to thereby improving the operability of the vehicle roof device.

As is described in the foregoing, according to the present invention, there is provided a vehicle roof device equipped with a sunroof member and a sunshade member, such that the vehicle roof device includes an operation switch having a simple structure and at the same time can provide good operability.

BRIEF DESCRIPTION OF THE DRAWINGS

Now the present invention is described in the following with reference to the appended drawings, in which:

FIGS. 6 to 9 are each a time chart showing an exemplary operation of the vehicle roof device shown in FIG. 1.

DETAILED DESCRIPTION OF THE PREFERRED EMBODIMENTS

Now, with reference to the appended drawings, description will be made of an embodiment of a vehicle roof device 1 according to the present invention. In the following description, directions such as a fore-and-aft direction and a lateral direction are defined with respect to the direction of travel of a vehicle V, and component parts having an identical or similar structure or function, such as a pair of component parts provided on either side of the vehicle V, will be denoted by reference signs including a common numeral suffixed with letters, such as "L" and "R" indicating "left" and "right," respectively. For example, a pair of stays provided on either side of the vehicle V will be denoted by reference signs 11L (left stay) and 11R (right stay), respectively, and when there is no need to distinguish the left and right stays from each other, they will be simply referred to as the stays 11 or each stay 11.

Figure 1:
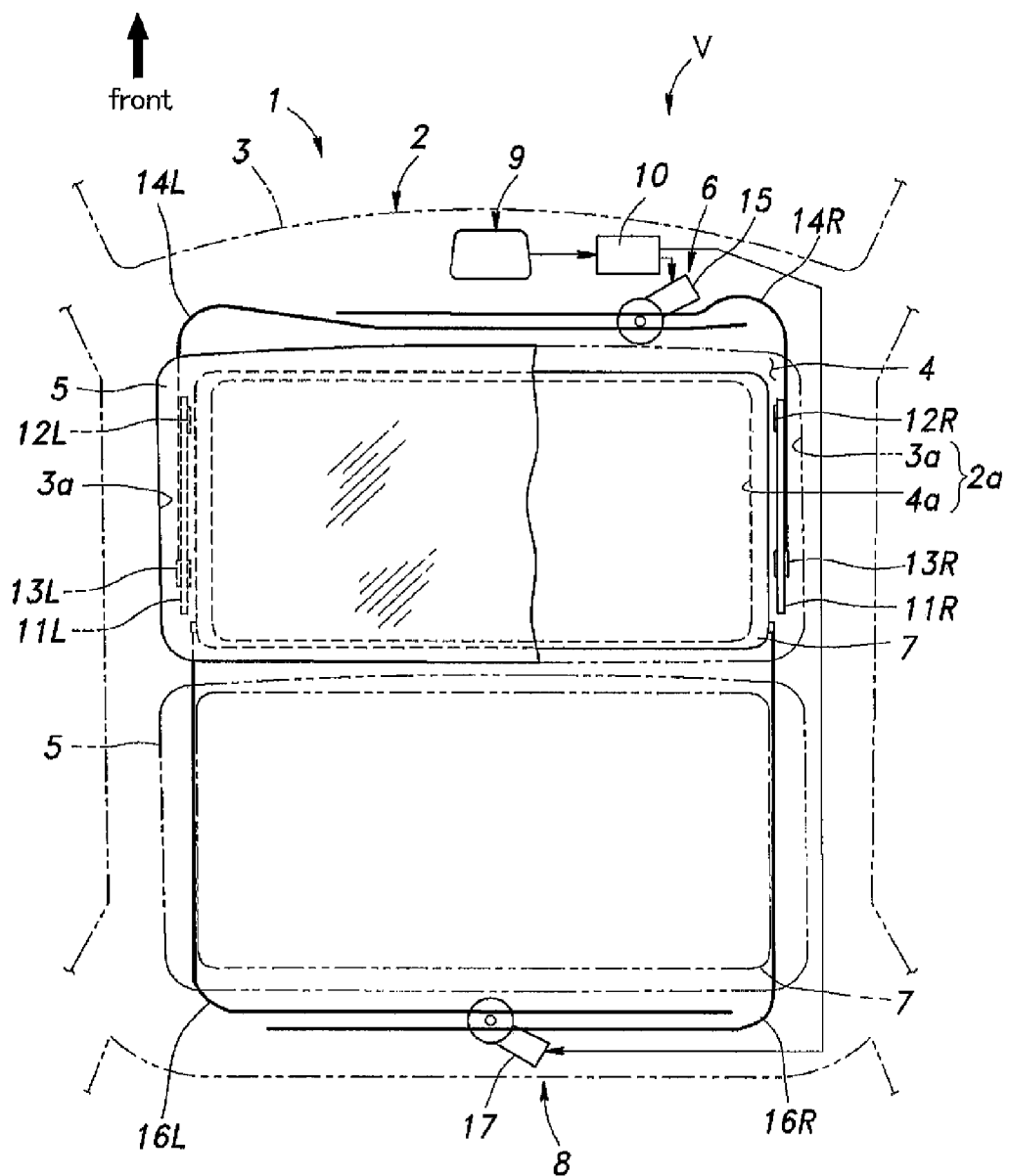
FIG. 1 is a schematic plan view of a vehicle roof including a vehicle roof device according to an embodiment of the present invention.

FIG. 1 is a schematic plan view of a roof 2 of a vehicle V. The roof 2 includes a fixed roof 3 forming a top part of an outer shell of the vehicle V and a roof lining 4 disposed under the fixed roof 3 and defining a vehicle cabin of the vehicle V. In FIG. 1, some component parts located under the fixed roof 3 are shown by solid lines for illustrative purposes. An opening 3a is formed in a front part of the fixed roof 3, and an opening 4a smaller than the opening 3a is formed in a front part of the roof lining 4 so as to overlap the opening 3a. The openings 3a and 4a jointly form an opening 2a of the roof 2.

The roof 2 is equipped with a sunroof device 6 including a sunroof panel 5 that selectively opens and closes the opening 3a in the fixed roof 3 and a sunshade device 8 including a sunshade panel 7 that selectively opens and closes the opening 4a in the roof lining 4. In FIG. 1, a part of the sunroof panel 5 is shown broken away for illustrative purposes. At a laterally central portion of the roof 2 in front of the opening 2a is mounted a switch unit 9 such that the switch unit 9 is exposed to the vehicle cabin for operation by a vehicle occupant. A control unit 10 for controlling the sunroof device 6 and the sunshade device 8 in response to an operation of the switch unit 9 by the vehicle occupant is disposed at an appropriate position in the vehicle V.

In the illustrated embodiment, the fixed roof 3 and the roof lining 4 define a space therebetween in which the sunroof device 6 is mounted, and the sunroof device 6 is of an inbuilt type in which the sunroof panel 5 is driven to slide rearward inside the space defined between the fixed roof 3 and the roof lining 4 when exposing the opening 3a.

A pair of stays 11L and 11R are attached to the sunroof panel 5 on either side of the sunroof panel 5 and support the sunroof panel 5. A pair of front sliders 12L and 12R are provided to front parts of the stays 11L and 11R, respectively, and a pair of rear sliders 13L and 13R are provided to rear parts of the stays 11L and 11R, respectively, via a known link mechanism. A pair of push pull cables 14L and 14R are connected to the rear sliders 13L and 13R, respectively, and the push pull cables 14L and 14R are pushed and pulled in synchronization with each other by a sunroof electric motor 15 disposed in the front part of the roof 2 and controlled by the control unit 10.

When the sunroof panel 5 is at a fully closed position which is shown by a solid line in FIG. 1 and at which the sunroof panel 5 closes the opening 3a, if the push pull cables 14 are pushed, the sunroof panel 5 is caused to slide rearward along guide rails not shown in the drawings toward a fully open position which is shown by an imaginary line in FIG. 1 and at which the sunroof panel 5 exposes the opening 3a. When the sunroof 5 is at the fully open position, if the push pull cables 14 are pulled, the sunroof panel 5 is caused to slide frontward toward the fully closed position. It is to be noted that the direction of sliding movement of the sunroof panel 5 to expose the opening 3a (i.e., toward the fully open position) may be referred to as an opening direction and the direction of sliding movement of the same to close the opening 3a (i.e., toward the fully closed position) may be referred to as a closing direction. In the illustrated embodiment, the opening and closing directions respectively coincide with the rearward and frontward directions of the vehicle body. The fully open position of the sunroof panel 5 is a position where the sunroof panel 5 has been fully moved in the opening direction, and the sunroof panel 5 does not necessarily have to expose the entirety of the opening 3a when it is at the fully open position.

When the sunroof panel 5 is at the fully closed position, if the push pull cables 14 are pulled, the sunroof panel 5 is tilted up such that the rear end of the sunroof panel 5 is lifted above the fixed roof 3 (the position where the sunroof panel 5 is fully tilted up will be referred to as a tilt-up position hereinafter). If the push pull cables 14 are pushed in this state, the sunroof panel 5 is tilted down back to the fully closed position. Thus, in this embodiment, the push pull cables 14 and the sunroof electric motor 15 for driving the push pull cables 14 constitute a tilting mechanism for the sunroof panel 5.

Similarly, a pair of push pull cables 16L and 16R are connected to the sunshade panel 7, such that the push pull cables 16L and 16R are pushed and pulled in synchronization with each other by a sunshade electric motor 17 disposed in the rear part of the roof 2 and controlled by the control unit 10. When the sunshade panel 7 is at a fully closed position which is shown by a solid line (and a broken line) in FIG. 1 and at which the sunshade panel 7 closes the opening 4a, if the push pull cables 16 are pulled, the sunshade panel 7 is caused to slide rearward toward a fully open position which is shown by an imaginary line in FIG. 1 and at which the sunshade panel 7 exposes the opening 4a. When the sunshade panel 7 is at the fully open position, if the push pull cables 16 are pushed, the sunshade panel 7 is caused to slide frontward toward the fully closed position. It is to be noted that the opening and closing directions of the sunshade panel 7 coincide with those of the sunroof panel 5 or the rearward and frontward directions of the vehicle body in this embodiment. Similarly to the sunroof panel 5, the fully open position of the sunshade panel 7 is a position where the sunshade panel 7 has been fully moved in the opening direction, and the sunshade panel 7 does not necessarily have to expose the entirety of the opening 4a when it is at the fully open position.

The control unit 10 monitors the rotating state of each of the sunroof electric motor 15 and the sunshade electric motor 17 while controlling the operation of them, and calculates the positions of the sunroof panel 5 and sunshade panel 7 based on the state of the sunroof electric motor 15 and the sunshade electric motor 17, respectively. Alternatively or in addition, the vehicle roof device 1 may include sensors for detecting the positions of the sunroof panel 5 and the sunshade panel 7, so that the control unit 10 can determine the position of each of the sunroof panel 5 and the sunshade panel 7 based on the signals from the sensors. Such sensors may include sensors or limit switches that detect positioning of the sunroof panel 5/sunshade panel 7 at the fully open/closed positions.

Figure 2A:
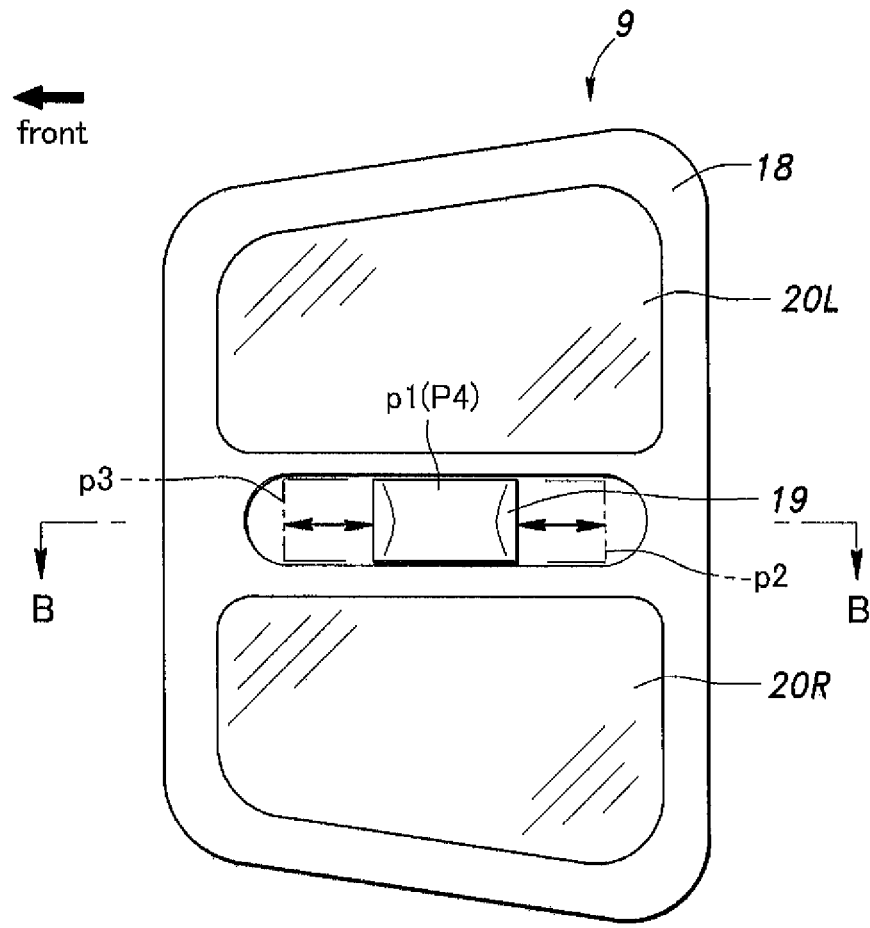
FIG. 2A is a bottom view of a switch unit shown in FIG. 1.
Figure 2B:
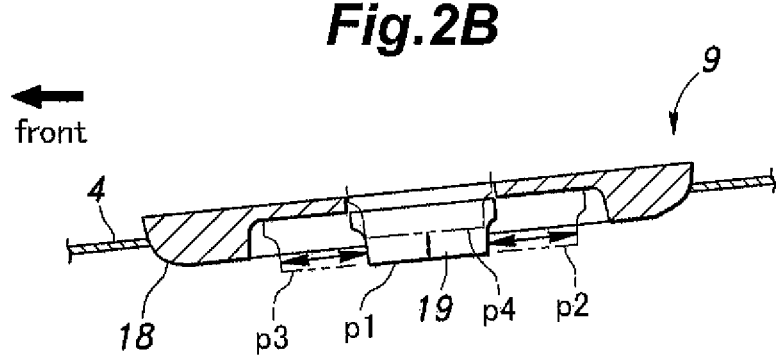
FIG. 2B is a cross-sectional view of the switch unit taken along line B-B in FIG. 2A.

As shown in FIG. 2, the switch unit 9 includes a base member 18 secured to the roof 2 and an operation member 19 mounted to the base member 18 so as to be movable relative to the base member 18. In addition to the operation member 19, the switch unit 9 is integrally provided with left and right map lamps 20L and 20R for the driver seat and the front passenger seat, respectively, and the operation member 19 is disposed between the map lamps 20, i.e., at a laterally central portion of the switch unit 9.

The base member 18 is configured to define four positions at which the operation member 19 may be positioned: a neutral position p1 shown by a solid line in FIG. 2; an opening operation position p2 displaced rearward from the neutral position p1; a closing operation position p3 displaced frontward from the neutral position p1; and a tilting operation position p4 displaced upward from the neutral position p1. The operation member 19 can be moved between the neutral position p1 and each of the opening operation position p2, closing operation position p3 and tilting operation position p4, and is always urged toward the neutral position p1 by an urging mechanism not shown in the drawing, whereby the operation member 19 returns to the neutral position p1 when released.

The switch unit 9 is configured to output to the control unit 10 an opening operation signal while the operation member 19 is positioned at the opening operation position p2, a closing operation signal while the operation member 19 is positioned at the closing operation position p3, and a tilting operation signal while the operation member 19 is positioned at the tilting operation position p4. For example, the switch unit 9 may include normally open contacts corresponding to the three operation positions p2, p3 and p4, respectively, such that when the operation member 19 is moved from the neutral position p1 to one of the operation positions p2, p3 and p4, the normally open contact corresponding to the one of the operation positions p2, p3 and p4 is closed to output a corresponding signal to the control unit 10. The control unit 10 counts the time period during which the opening operation signal, closing operation signal or tilting operation signal is continuously input thereto, and resets the counted time period to zero upon termination of the input of the operation signal when the operation member 19 is returned to the neutral position p1. In this way, the control unit 10 can compute the duration of the operation member 19 held at the opening operation position p2, the closing operation position p3 or the tilting operation position p4.

Figure 3:
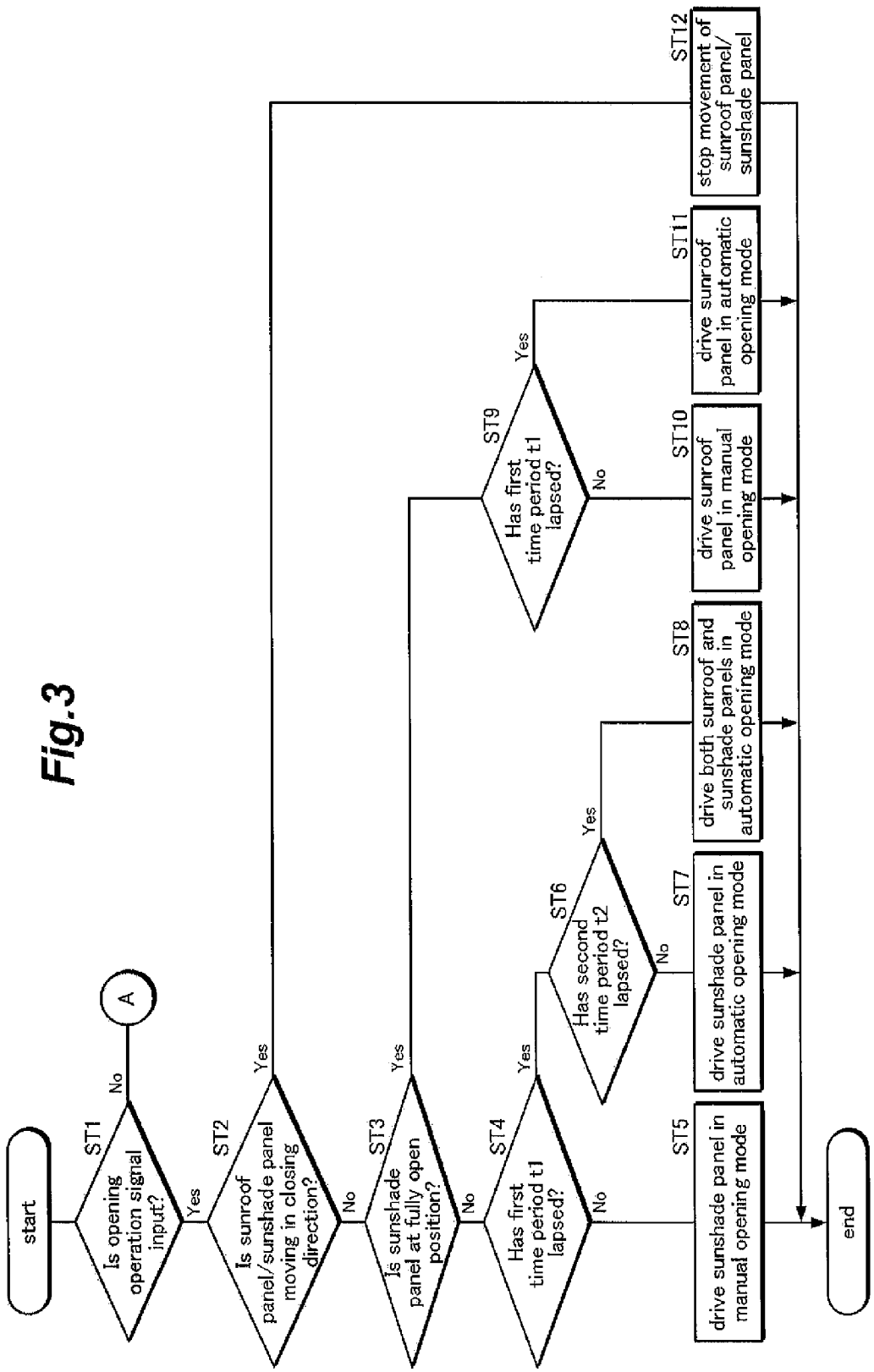
FIGS. 3 to 5 are each a flowchart showing a process performed by a control unit shown in FIG. 1 to select an operation mode of the vehicle roof device shown in FIG. 1.

The control unit 10 selects an operation mode based on an operation performed by a user on the switch unit 9, and accordingly controls the sunroof device 6 and the sunshade device 8 (more specifically, controls the sunroof electric motor 15 and the sunshade electric motor 17). In the illustrated embodiment, as shown in FIG. 3, when the opening operation signal is input (step ST1: Yes), the control unit 10 determines whether one or both of the sunroof panel 5 and the sunshade panel 7 are being moved in the closing direction (step ST2), and if neither of the sunroof panel 5 and the sunshade panel 7 is being moved in the closing direction (step ST2: No), the control unit 10 determines whether the sunshade panel 7 is at the fully open position (step ST3). If the sunshade panel 7 is not at the fully open position (step ST3: No), the control unit 10 determines in step ST4 whether the time period during which the opening operation signal is continuously input is equal to or longer than a first predetermined time period t1 (for example, 2 seconds), and if this is not the case (step ST4: No), the control unit 10 controls the sunshade device 8 to move the sunshade panel 7 in the opening direction only while the opening operation signal is being input (step ST5). It is to be noted that the operation mode in which the sunshade panel 7 (or the sunroof panel 5) is moved in the opening direction only while the opening operation signal is being input may be referred to as a manual opening mode.

On the other hand, if the time period during which the opening operation signal is continuously input is equal to or longer than the first predetermined time period t1 (step ST4: YES), the control unit 10 determines in step ST6 whether the time period during which the opening operation signal is continuously input is equal to or longer than a second predetermined time period t2 (for example, 4 seconds) that is longer than the first predetermined time period t1, and if this is not the case (step ST6: No), the control unit 10 controls the sunshade device 8 to automatically open the sunshade panel 7 (step ST7). It is to be noted here that "automatically open" means continuing sliding movement of the sunshade panel 7 (or the sunroof panel 5 in the case where the sunroof panel 5 is slidingly moved) in the opening direction even after termination of input of the opening operation signal until the sunshade panel 7 (or the sunroof panel 5) reaches the fully open position. The operation mode in which the sunshade panel 7 (or the sunroof panel 5) is slidingly moved to the fully open position automatically may be referred to as an automatic opening mode. When the time period during which the opening operation signal is continuously input reaches the first predetermined time period t1 during driving of the sunshade panel 7 toward the fully open position in the manual opening mode, the control unit 10 controls the sunshade device 8 to keep the movement of the sunshade panel 7 in the opening direction but switches the operation mode from the manual opening mode (namely, an operation mode in which input of the opening operation signal is required to keep the sunshade panel 7 moving in the opening direction) to the automatic opening mode (namely, an operation mode in which input of the opening operation signal is not required to keep the sunshade panel 7 moving in the opening direction). It is to be noted that the roof device 1 may include any known pinching prevention device which, when the sunshade panel 7 is being driven in the manual opening mode or in the automatic opening mode, terminates the driving of the sunshade panel 7 if the load on the sunshade electric motor 17 of the sunshade device 8 becomes excessively large due to pinching of a foreign object by the sunshade panel 7 or for any other reason. Part or all of the functions of the pinching prevention device may be carried out by the control unit 10. Further, a similar pinching prevention device may also be provided to prevent pinching of a foreign object by the sunroof panel 5.

If it is determined in step ST6 that the time period during which the opening operation signal is continuously input is equal to or longer than the second predetermined time period t2 (step ST6: Yes), the control unit 10 controls the sunshade device 8 and the sunroof device 6 to automatically move both the sunshade panel 7 and the sunroof panel 5 to the respective fully open positions (step ST8). In other words, the control unit 10 selects the automatic opening mode for each of the sunroof device 6 and the sunshade device 8. Thus, in the illustrated embodiment where the second predetermined time period t2 is 4 seconds, if the opening operation signal is continuously input (namely, if the operation member 19 is held at the opening operation position p2) for a time period longer than the second predetermined time period t2 when the sunshade panel 7 is not at the fully open position, the sunshade panel 7 alone is moved in the opening direction for the first 4 seconds from the start of input of the opening operation signal, and thereafter, both the sunshade panel 7 and the sunroof panel 5 are moved in the opening direction in the automatic opening mode.

If it is found in step ST3 that the sunshade panel 7 is at the fully open position (step ST3: Yes), the control unit 10 determines whether the time period during which the opening operation signal is continuously input is equal to or longer than the first predetermined time period t1 (step ST9). The control unit 10 controls the sunroof device 6 to move the sunroof panel 5 toward the fully open position in the manual opening mode (step ST10) until the time period during which the opening operation signal is continuously input reaches the first predetermined time period t1 (namely, so long as the determination result in step ST9 is "No"). Once the time period during which the opening operation signal is continuously input reaches the first predetermined time period t1, the control unit 10 controls the sunroof device 6 to move the sunroof panel 5 toward the fully open position in the automatic opening mode (step ST11).

If it is found in step ST2 that one or both of the sunroof panel 5 and the sunshade panel 7 are being moved in the closing direction (step ST2: Yes), the control unit 10 controls the sunroof device 6 and/or the sunshade device 8 to stop the movement of the one or both of the sunroof panel 5 and the sunshade panel 7 in the closing direction (step ST12). This operation mode is provided to allow a vehicle occupant to stop the movement of one or both of the sunroof panel 5 and the sunshade panel 7 at a desired position by moving the operation member 19 from the neutral position p1 to the opening operation position p2 when one or both of the sunroof panel 5 and the sunshade panel 7 are being moved in the closing direction in a later-described automatic closing mode. Owing to this operation mode, when it is desired to move the sunroof panel 5 from the fully open position to a position near the fully closed position, for example, the sunroof panel 5 can be moved to the desired position with a simpler operation as compared to a case where the sunroof panel 5 is moved in the closing direction multiple times in a later-described manual closing mode such that the sunroof panel 5 approaches the desired position little by little, or as compared to a case where the sunroof panel 5 is first moved to the fully closed position in the automatic closing mode and then is moved back in the opening direction in the manual opening mode until it reaches the desired position.

Figure 4:
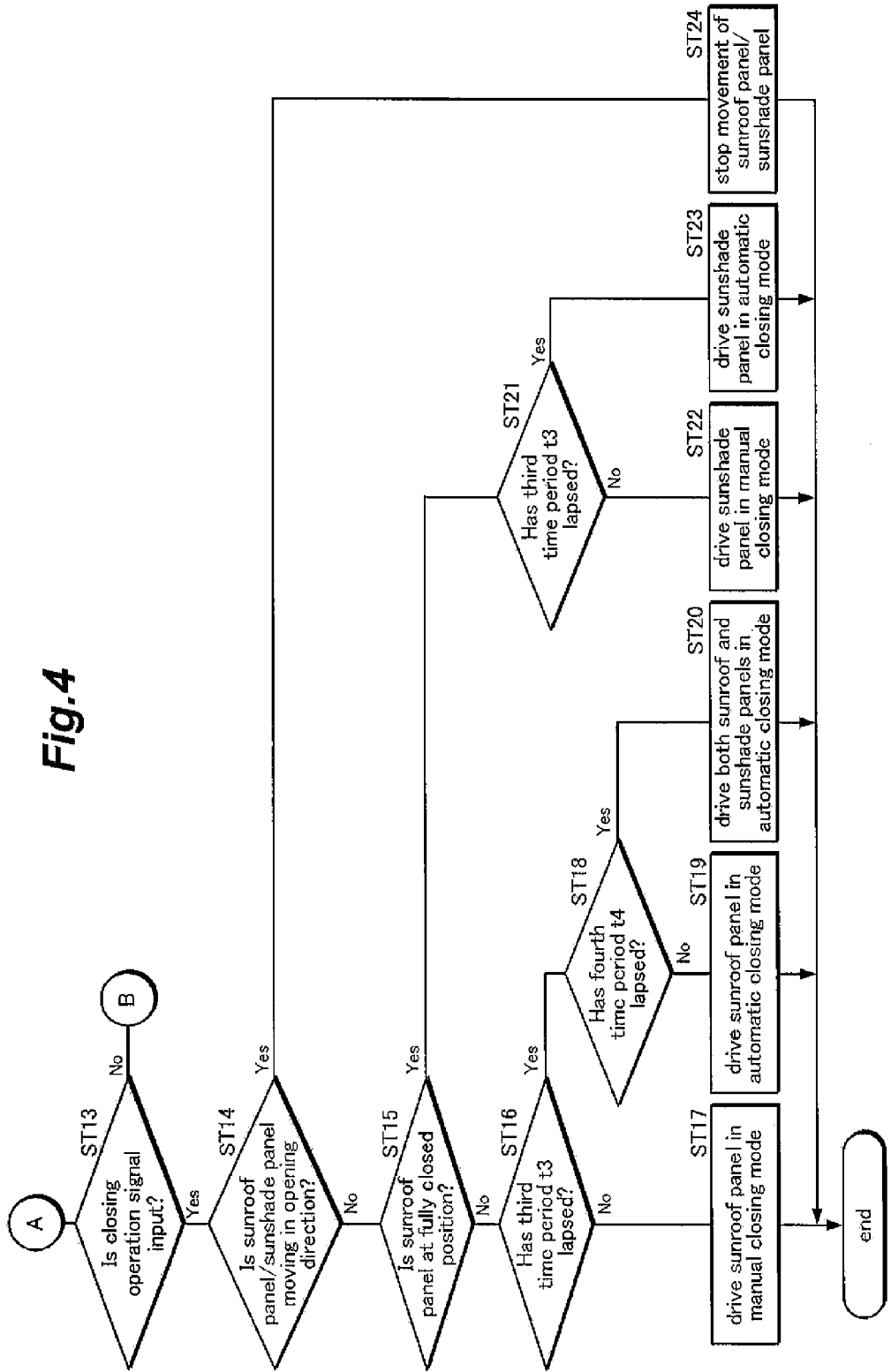

Next, with reference to FIG. 4, description will be made of an operation in a case where the opening operation signal is not input (step ST1: No). When the closing operation signal is input (step ST13: Yes), the control unit 10 determines whether one or both of the sunroof panel 5 and the sunshade panel 7 are being moved in the opening direction (step ST14), and if neither of the sunroof panel 5 and the sunshade panel 7 is being moved in the opening direction (step ST14: No), the control unit 10 determines whether the sunroof panel 5 is at the fully closed position (step ST15). If the sunroof panel 5 is not at the fully closed position (step ST15: No), the control unit 10 determines in step ST16 whether the time period during which the closing operation signal is continuously input is equal to or longer than a third predetermined time period t3 (for example, 2 seconds), and if this is not the case (step ST16: No), the control unit 10 controls the sunroof device 6 to move the sunroof panel 5 in the closing direction only while the closing operation signal is being input (step ST17). It is to be noted that the operation mode in which the sunroof panel 5 (or the sunshade panel 7) is moved in the closing direction only while the closing operation signal is being input may be referred to as a manual closing mode.

On the other hand, if the time period during which the closing operation signal is continuously input is equal to or longer than the third predetermined time period t3 (step ST16: YES), the control unit 10 determines whether the time period during which the closing operation signal is continuously input is equal to or longer than a fourth predetermined time period t4 (for example, 4 sec) that is longer than the third predetermined time period t3 (step ST18), and if this is not the case (step ST18: No), the control unit 10 controls the sunroof device 6 to automatically close the sunroof panel 5 (step ST19). It is to be noted here that "automatically close" means continuing movement of the sunroof panel 5 (or the sunshade panel 7 in the case where the sunshade panel 7 is moved) in the closing direction even after termination of input of the closing operation signal until the sunroof panel 5 (or the sunshade panel 7) reaches the fully closed position. The operation mode in which the sunroof panel 5 (or the sunshade panel 7) is moved to the fully closed position automatically may be referred to as an automatic closing mode. When the time period during which the closing operation signal is continuously input reaches the third predetermined time period t3 during driving of the sunroof panel 5 toward the fully closed position in the manual closing mode, the control unit 10 controls the sunroof device 6 to keep the movement of the sunroof panel 5 toward the fully closed position but switches the operation mode of the sunroof device 6 from the manual closing mode (namely, an operation mode in which input of the closing operation signal is required to keep the sunroof panel 5 moving in the closing direction) to the automatic closing mode (namely, an operation mode in which input of the closing operation signal is not required to keep the sunroof panel 5 moving in the closing direction). Similarly to when the sunroof panel 5 or the sunshade panel 7 is moved in the opening direction, it is preferred that, when the sunroof panel 5 or the sunshade panel 7 is being driven in the manual closing mode or in the automatic closing mode, the driving of the sunroof panel 5 or the sunshade panel 7 be terminated if the load on the sunroof electric motor 15 or the sunshade electric motor 17 becomes excessively large due to pinching of a foreign object or for any other reason.

If it is determined in step ST 18 that the time period during which the closing operation signal is continuously input is equal to or longer than the fourth predetermined time period t4 (step ST18: Yes), the control unit 10 controls the sunroof device 6 and the sunshade device 8 to automatically move both the sunroof panel 5 and the sunshade panel 7 to the respective fully closed positions (step ST20). In other words, the control unit 10 selects the automatic closing mode for each of the sunroof device 6 and the sunshade device 8. Thus, in the illustrated embodiment where the fourth predetermined time period t4 is 4 seconds, if the closing operation signal is continuously input (namely, if the operation member 19 is held at the closing operation position p3) for a time period longer than the fourth predetermined time period t4 when the sunroof panel 5 is not at the fully closed position, the sunroof panel 5 alone is moved in the closing direction for the first 4 seconds from the start of input of the closing operation signal, and thereafter, both the sunroof panel 5 and the sunshade panel 7 are moved in the closing direction in the automatic closing mode.

If it is found in step ST15 that the sunroof panel 5 is at the fully closed position (step ST15: Yes), the control unit 10 determines whether the time period during which the closing operation signal is continuously input is equal to or longer than the third predetermined time period t3 (step ST21). The control unit 10 controls the sunshade device 8 to move the sunshade panel 7 toward the fully closed position in the manual closing mode (step ST22) until the time period during which the closing operation signal is continuously input reaches the third predetermined time period t3 (namely, so long as the determination result in step ST21 is "No"). Once the time period during which the closing operation signal is continuously input reaches the third predetermined time period t3, the control unit 10 controls the sunshade device 8 to move the sunshade panel 7 toward the fully closed position in the automatic closing mode (step ST23).

If it is found in step ST14 that one or both of the sunroof panel 5 and the sunshade panel 7 are being moved in the opening direction (step ST14: Yes), the control unit 10 controls the sunroof device 6 and/or the sunshade device 8 to stop the movement of the one or both of the sunroof panel 5 and the sunshade panel 7 in the opening direction (step ST24). This operation mode is provided to allow a vehicle occupant to stop the movement of one or both of the sunroof panel 5 and the sunshade panel 7 at a desired position by operating the operation member 19 from the neutral position p1 to the closing operation position p3 when one or both of the sunroof panel 5 and the sunshade panel 7 are being moved in the opening direction in the above-described automatic opening mode. Owing to this operation mode, when it is desired to move the sunshade panel 7 from the fully closed position to a position near the fully open position, for example, the sunshade panel 7 can be moved to the desired position with a simpler operation as compared to a case where the sunshade panel 7 is moved in the opening direction multiple times in the above-described manual opening mode such that the sunshade panel 7 approaches the desired position little by little, or as compared to a case where the sunshade panel 7 is first moved to the fully open position in the automatic opening mode and then is moved back in the closing direction in the manual closing mode until it reaches the desired position.

Figure 5:
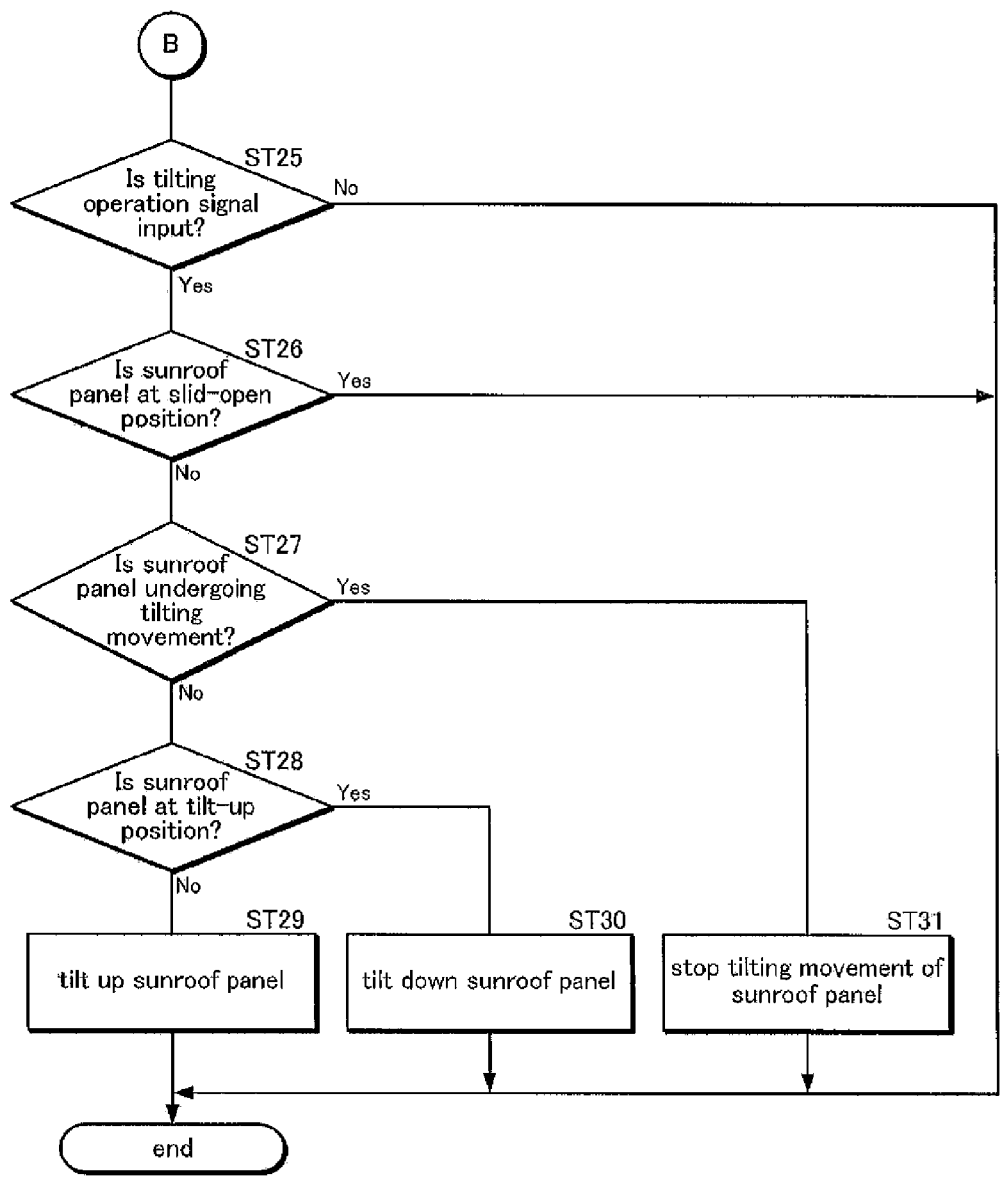

Next, with reference to FIG. 5, description will be made of an operation in a case where neither the opening operation signal nor the closing operation signal is input (step ST1: No and step ST13: No). When the tilting operation signal is input (step ST25: Yes), the control unit 10 determines whether the sunroof panel 5 is at a slid-open position, , a position displaced from the fully closed position in the opening direction (step ST26), and if this is not the case (step ST26: No), the control unit 10 determines whether the sunroof panel 5 is undergoing tilting movement (step ST27). If the sunroof panel 5 is not undergoing tilting movement (step ST27: No), the control unit 10 determines in step ST28 whether the sunroof panel 5 is at the tilt-up position, and if this is not the case (step ST28: No), the control unit 10 controls the sunroof device 6 to tilt up the sunroof panel 5 (step ST29). On the other hand, if the sunroof panel 5 is at the tilt-up position (step ST28: Yes), the control unit 10 controls the sunroof device 6 to tilt down the sunroof panel 5 (step ST30). It is to be noted that in this embodiment, when the sunroof panel 5 is tilted up, the sunroof panel 5 is moved to the tilt-up position automatically even after termination of input of the tilting operation signal, and similarly, when the sunroof panel 5 is tilted down, the sunroof panel 5 is moved to the fully closed position automatically even after termination of input of the tilting operation signal.

If it is found in step ST27 that the sunroof panel 5 is undergoing tilting movement (step ST27: Yes), the control unit 10 controls the sunroof device 6 to stop the tilting movement of the sunroof panel 5 (step ST31). This operation mode is provided to allow a vehicle occupant to stop the tilting movement of the sunroof panel 5 at a desired tilting angle by moving the operation member 19 from the neutral position p1 to the tilting operation position p4 when the sunroof panel 5 is being tilted up or down automatically.

If the sunroof panel 5 is at a position displaced from the fully closed position in the opening direction (step ST26: Yes) when the tilting operation signal is input (step ST25: Yes), or if no tilting operation signal is input (step ST25: No), no operation is performed.

Figure 6:
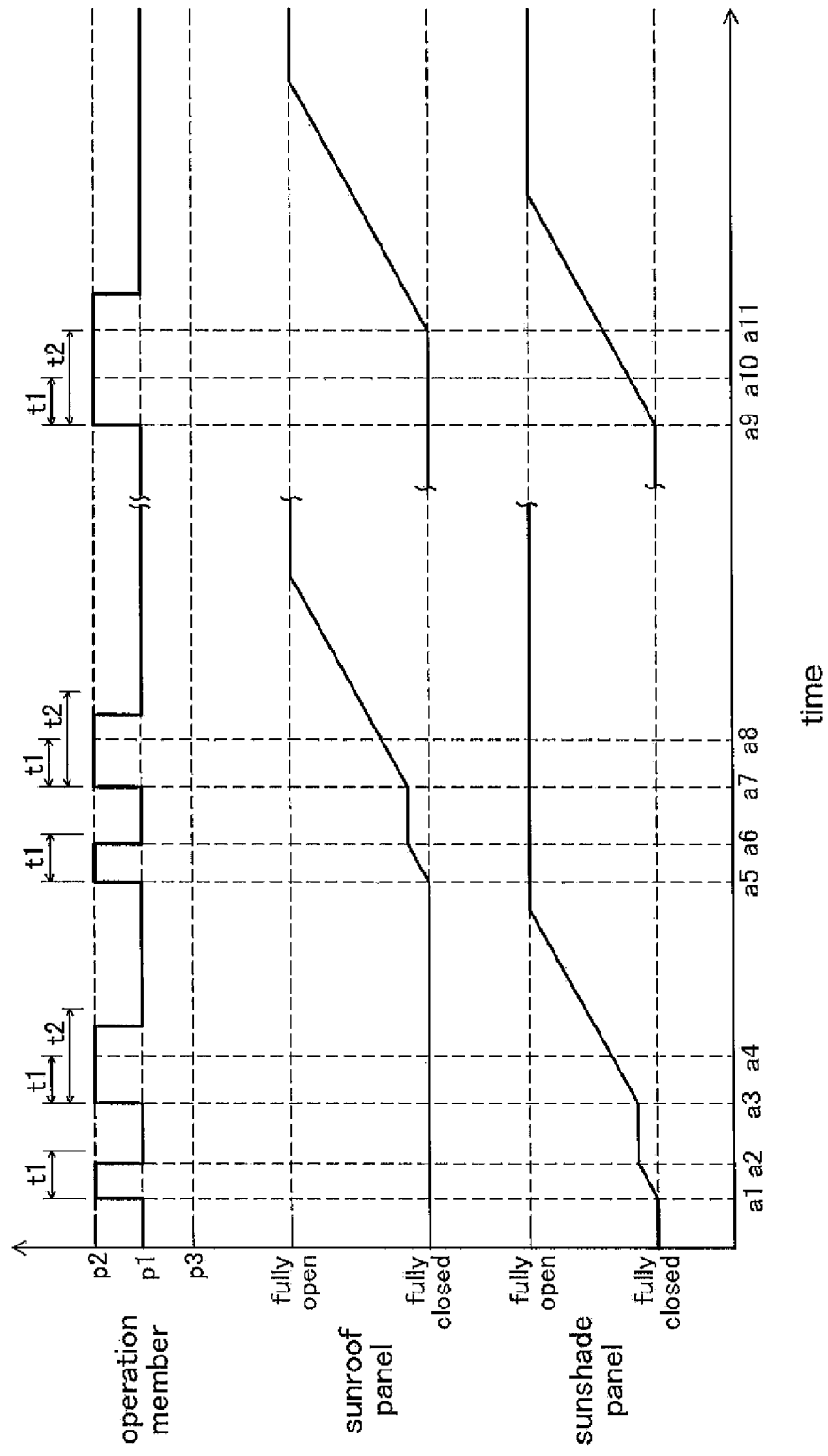

Next, with reference to the time charts shown in FIGS. 6-9, description will be made of exemplary operations of the sunroof panel 5 and the sunshade panel 7 controlled as described in the foregoing. With reference to FIG. 6, when the operation member 19 is operated (namely, moved) from the neutral position p1 to the opening operation position p2 at a time point a1 in a state where each of the sunroof panel 5 and the sunshade panel 7 is at the fully closed position, the sunshade panel 7 is caused to begin moving in the opening direction with a higher priority than the sunroof panel 5. The movement of the sunshade panel 7 in the opening direction is terminated at a time point a2 at which the operation member 19 is returned to the neutral position p1, since the duration of the operation member 19 held at the opening operation position p2 is shorter than the first predetermined time period t1 in this case.

Thereafter, when the operation member 19 is moved again to the opening operation position p2 at a time point a3, the sunshade panel 7 is caused to begin moving in the opening direction again, and at a time point a4 where the duration of the operation member 19 held at the opening operation position p2 reaches the first predetermined time period t1, the operation mode for the sunshade panel 7 is switched from the manual opening mode to the automatic opening mode. If the operation member 19 is returned to the neutral position p1 before the duration of the operation member 19 held at the opening operation position p2 reaches the second predetermined time period t2, only the sunshade panel 7 is driven to the fully open position without the sunroof panel 5 being moved in the opening direction.

When the operation member 19 is moved to the opening operation position p2 at a time point a5 after the sunshade panel 7 is moved to the fully open position, the sunroof panel 5 is caused to begin moving in the opening direction. The movement of the sunroof panel 5 in the opening direction is terminated at a time point a6 at which the operation member 19 is returned to the neutral position p1, since the duration of the operation member 19 held at the opening operation position p2 is shorter than the first predetermined time period t1. Thereafter, when the operation member 19 is moved again to the opening operation position p2 at a time point a7, the sunroof panel 5 is caused to begin moving in the opening direction again, and at a time point a8 where the duration of the operation member 19 held at the opening operation position p2 reaches the first predetermined time period t1, the operation mode for the sunroof panel 5 is switched from the manual opening mode to the automatic opening mode, whereby the sunroof panel 5 is driven to the fully open position even after the operation member 19 is released back to the neutral position p1.

When the operation member 19 is moved from the neutral position p1 to the opening operation position p2 at a time point a9 in the state where each of the sunroof panel 5 and the sunshade panel 7 is at the fully closed position, the sunshade panel 7 is caused to begin moving in the opening direction with a higher priority than the sunroof panel 5, in the same manner as at the time point a1. When the duration of the operation member 19 held at the opening operation position p2 reaches the first predetermined time period t1 at a time point a10, the operation mode for the sunshade panel 7 is switched from the manual opening mode to the automatic opening mode in the same manner as at the time point a4. Thereafter, when the duration of the operation member 19 held at the opening operation position p2 reaches the second predetermined time period t2 at a time point a11, the sunroof panel 5 in addition is caused to begin moving toward the fully open position in the automatic opening mode, whereby both the sunshade panel 7 and the sunroof panel 5 continue to move to the respective fully open positions even after the operation member 19 is returned to the neutral position p1.

Figure 7:
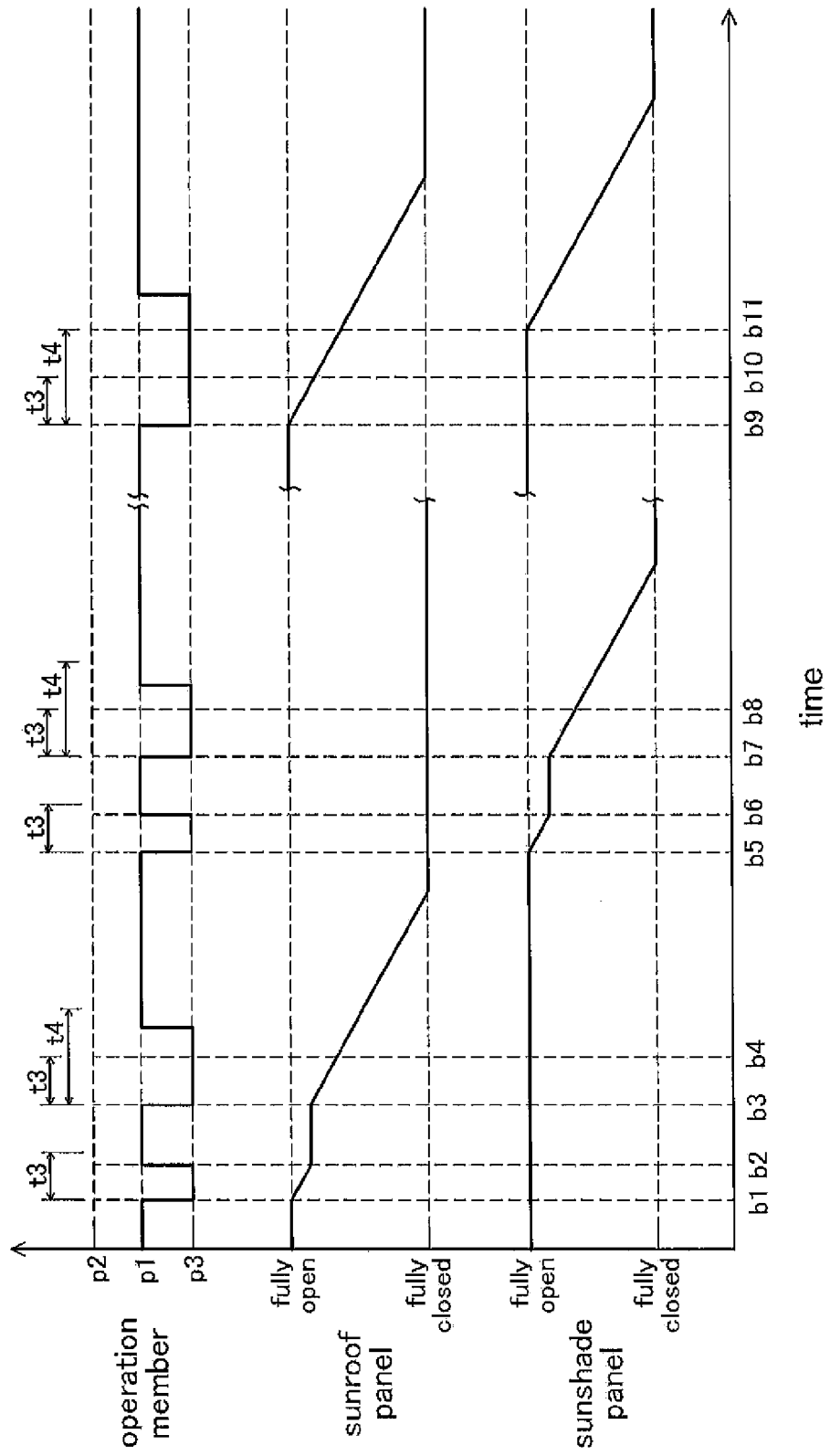

FIG. 7 shows exemplary operations of the sunroof panel 5 and the sunshade panel 7, in which the operation member 19 is moved from the neutral position p1 to the closing operation position p3 at various time points, with each of the sunroof panel 5 and the sunshade panel 7 being positioned at the fully open position in an initial state. The exemplary operations shown in FIG. 7 may correspond to those described in the foregoing with reference to FIG. 6 where the operation member 19 is moved from the neutral position p1 to the opening operation position p2 at various time points, with each of the sunroof panel 5 and the sunshade panel 7 being at the fully closed position in an initial state. Therefore, detailed description of the exemplary operations shown in FIG. 7 is omitted. It is to be noted that the time points $b_n$ (n is an integer of one or more) in FIG. 7 correspond to the time points $a_n$ (n is an integer of one or more) in FIG. 6, respectively, while the third and forth predetermined time periods t3 and t4 in FIG. 7 correspond to the first and second predetermined time periods t1 and t2 in FIG. 6, respectively. As is shown in FIG. 7, when the operation member 19 is moved from the neutral position p1 to the closing operation position p3, the sunroof panel 5 is caused to move in the closing direction with a higher priority than the sunshade panel 7.

Figure 8:
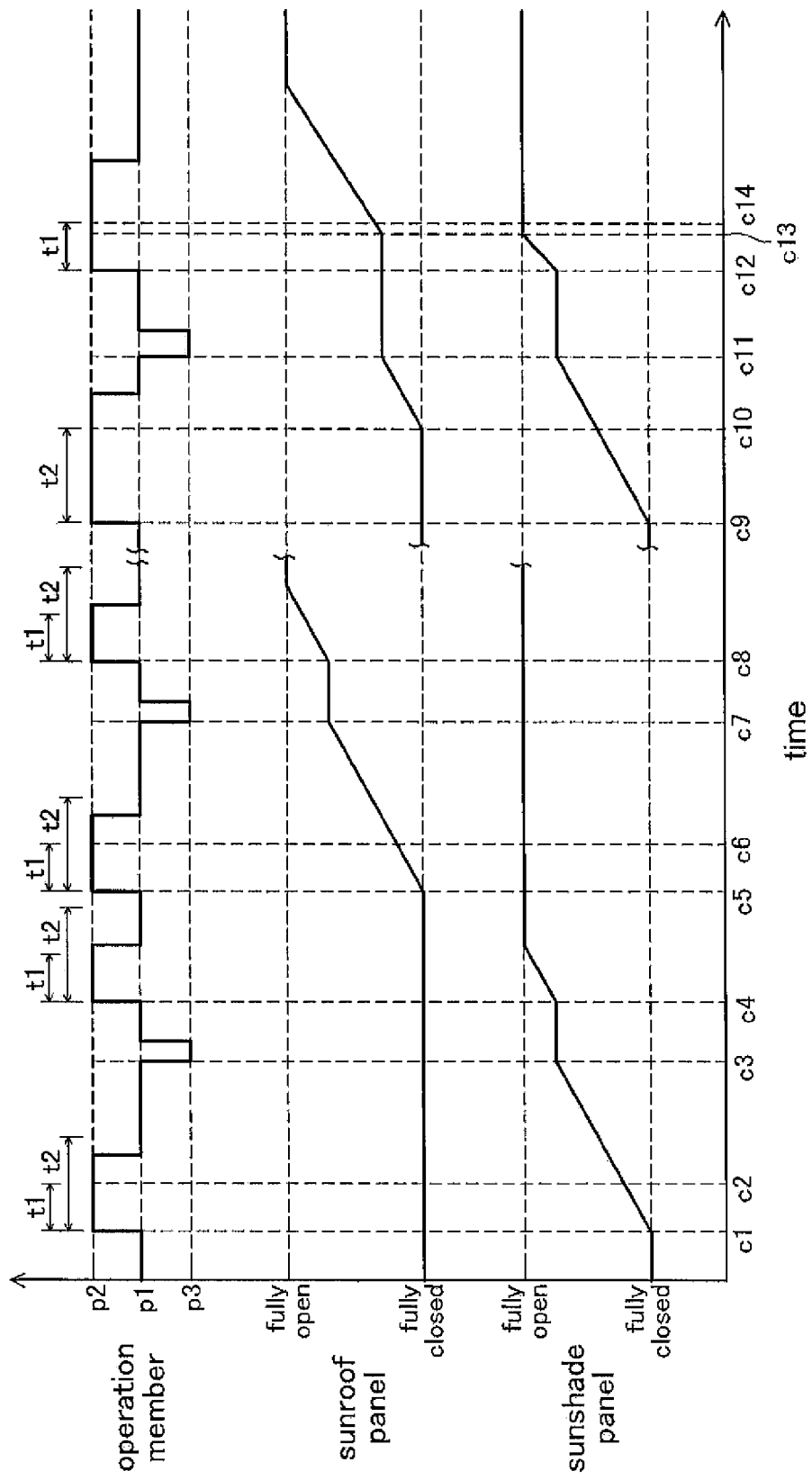

FIG. 8 shows exemplary operations of the sunroof panel 5 and the sunshade panel 7 in which the sliding movement of the sunroof panel 5 and the sunshade panel 7 in the opening direction is stopped at various timings. When the operation member 19 is moved from the neutral position p1 to the opening operation position p3 at a time point c1 in the state where each of the sunroof panel 5 and the sunshade panel 7 is at the fully closed position, the sunshade panel 7 is caused to begin moving in the opening direction in the manual opening mode, and when the duration of the operation member 19 held at the opening operation position p2 reaches the first predetermined time period t1 at a time point c2, the operation mode for the sunshade panel 7 is switched from the manual opening mode to the automatic opening mode, whereby the sunshade panel 7 continues to move in the opening direction after the operation member 19 is returned to the neutral position p1. Thereafter, when the operation member 19 is moved to the closing operation position p3 for a short time period at a time point c3 while the sunshade panel 7 is being moved in the opening direction in the automatic opening mode, the movement of the sunshade panel 7 in the opening direction is stopped. Subsequently, when the operation member 19 is moved to the opening operation position p2 again at a time point c4, the sunshade panel 7 is caused to move to the fully open position.

In this state, when the operation member 19 is again moved to the opening operation position p2 at a time point c5, the sunroof panel 5 is caused to begin moving in the opening direction, and when the duration of the operation member 19 held at the opening operation position p2 reaches the first predetermined time period t1 at a time point c6, the operation mode for the sunroof panel 5 is switched from the manual opening mode to the automatic opening mode, whereby the sunroof panel 5 continues to move in the opening direction after the operation member 19 is returned to the neutral position p1. Thereafter, when the operation member 19 is moved to the closing operation position p3 for a short time period at a time point c7 while the sunroof panel 5 is being moved in the opening direction in the automatic opening mode, the movement of the sunroof panel 5 in the opening direction is stopped. Subsequently, when the operation member 19 is moved to the opening operation position p2 again at a time point c8, the sunroof panel 5 is again caused to begin moving toward the fully open position.

On the other hand, when the operation member 19 is moved to the opening operation position p2 at a time point c9 in the state where each of the sunroof panel 5 and the sunshade panel 7 is at the fully closed position, the sunshade panel 7 is caused to begin moving in the opening direction with a higher priority than the sunroof panel 5, and thereafter, when the duration of the operation member 19 positioned at the opening operation position p2 reaches the second predetermined time period t2 at a time point c10, both the sunshade panel 7 and the sunroof panel 5 are caused to move toward the respective fully open positions in the automatic opening mode. Subsequently, when the operation member 19 is moved from the neutral position p1 to the closing operation position p3 for a short time period at a time point c11 while both the sunroof panel 5 and the sunshade panel 7 are being moved in the opening direction in the automatic opening mode, the movement of each of the sunroof panel 5 and the sunshade panel 7 in the opening direction is stopped. Thereafter, when the operation member 19 is moved to the opening operation position p2 again at a time point c12, the sunshade panel 7 is caused to move toward the fully open position, and when the sunshade panel 7 reaches the fully open position at a time point C13, the sunroof panel 5 is caused to begin moving in the opening direction again in the manual opening mode. When the duration of the operation member 19 held at the opening operation position p2 reaches the first predetermined time period t1 at a time point c14, the operation mode for the sunroof panel 5 is switched from the manual opening mode to the automatic opening mode, whereby the sunroof panel 5 continues to move to the fully open position even after the operation member 19 is returned to the neutral position p1.

It is to be noted that movement of the sunroof panel 5 and the sunshade panel 7 in the closing direction may be stopped at various timings in a manner similar to that described above with reference to FIG. 8 relating to the movement of the sunroof panel 5 and the sunshade panel 7 in the opening direction.

Next, with reference to FIG. 9, description will be made of exemplary tilting operations of the sunroof panel 5. When the operation member 19 is moved from the neutral position p1 to the tilting operation position p4 at a time point d1 in a state where the sunroof panel 5 is at the fully closed position, the sunroof panel 5 is caused to begin tilt-up movement. In this embodiment, the sunroof panel 5 is moved to the tilt-up position automatically upon movement of the operation member 19 to the tilting operation position p4, irrespective of the duration of the operation member 19 held at the tilting operation position p4. Namely, the tilting of the sunroof panel 5 is performed in an automatic mode, though it is possible in another embodiment to perform the tilting of the sunroof panel 5 in a manual mode, in which the sunroof panel 5 is caused to undergo tilt-up movement only while the operation member 19 is positioned at the tilting operation position p4.

When the operation member 19 is moved from the neutral position p1 to the tilting operation position p4 at a time point d2 in the state where the sunroof panel 5 is at the tilt-up position, the sunroof device 5 is caused to begin tilt-down movement. Similarly to the tilt-up movement, the sunroof panel device 5 is moved to the fully closed position automatically without need for a vehicle occupant to keep the operation member 19 at the tilting operation position p4.

In a case where, after the operation member 19 is moved from the neutral position p1 to the tilting operation position p4 at a time point d3 in the state where the sunroof panel 5 is at the fully closed position to cause the sunroof panel 5 to begin tilt-up movement, the operation member 19 is moved again from the neutral position p1 to the tilting operation position p4 at a time point d4 while the sunroof panel 5 is undergoing the tilt-up movement, the tilt-up movement of the sunroof panel 5 is stopped. Thereafter, when the operation member 19 is moved from the neutral position p1 to the tilting operation position p4 again at a time point d5, the sunroof panel 5 resumes the tilt-up movement.

Similarly, in a case where, after the operation member 19 is moved from the neutral position p1 to the tilting operation position p4 at a time point d6 in the state where the sunroof panel 5 is at the tilt-up position to cause the sunroof panel 5 to begin tilt-down movement, the operation member 19 is moved again from the neutral position p1 to the tilting operation position p4 at a time point d7 while the sunroof panel 5 is undergoing the tilt-down movement, the tilt-down movement of the sunroof panel 5 is stopped. Thereafter, when the operation member 19 is moved from the neutral position p1 to the tilting operation position p4 again at a time point d8, the sunroof panel 5 begins tilt-up movement. If the operation member 19 is moved again from the neutral position p1 to the tilting operation position p4 at a time point d9 in the state where the sunroof panel 5 is at the fully open position, the sunroof panel 5 begins tilt-down movement toward the fully closed position in the same manner as at the time point d2 or d6.

The vehicle roof device 1 configured as described in the foregoing according to the preferred embodiment of the present invention can bring about the following advantageous effects. Namely, since the switch unit 9 has only a single operation position for the operation member 19 (the opening operation position p2 or the closing operation position p3) defined in each of the forward and rearward operating directions relative to the neutral position p1, the structure of the switch unit 9 is simplified as compared to a case where more than one operation position are defined in each operating direction. Since such a switch unit 9 requires a small operation range of the operation member 19, the base member 18 of the switch unit 9 can be reduced in size.

Further, in the above-described embodiment, when the operation member 19 is moved from the neutral position p1 to one of the opening operation position p2 and the closing operation position p3, the control unit 10 controls the sunroof device 5 (sunroof electric motor 15) and the sunshade device 8 (sunshade electric motor 17) so as to drive the sunroof panel 6 and the sunshade panel 7 in an operation mode determined based on a relationship of a duration of the operation member 19 held at the one of the opening operation position p2 and the closing operation position p3 with two different threshold time periods (first and second predetermined time periods t1 and t2 when the operation member 19 is moved to the opening operation position p2, and the third and forth predetermined time periods t3 and t4 when the operation member 19 is moved to the closing operation position p3).

Specifically, in a case where the operation member 19 is moved to the opening operation position p2, namely, the opening operation signal is input (step ST1: Yes) when the sunshade panel 7 is not at the fully open position (step ST3: No), the control unit 10 controls the sunroof device 5 and the sunshade device 8 to drive the sunshade panel 7 and the sunroof panel 5 in the opening direction in one of the three different operation modes (steps ST5, ST7, ST8) depending on whether the operation member 19 has been held at the opening operation position p2 for less than the first predetermined time period t1 (step ST4: No), the operation member 19 has been held at the opening operation position p2 for a time period equal to or longer than the first predetermined time period t1 and less than the second predetermined time period t2 (step ST6: No), or the operation member 19 has been held at the opening operation position p2 for a time period equal to or longer than the second predetermined time period t2 (step ST6: Yes). In a case where the operation member 19 is moved to the opening operation position p2 (step ST1: Yes) when the sunshade panel 7 is at the fully open position (step ST3: Yes), the control unit 10 controls the movement of the sunroof panel 5 in the opening direction in one of the two different operation modes (steps ST10, ST11) depending on whether the operation member 19 has been held at the opening operation position p2 for less than the first predetermined time period t1 (step ST9: No) or for a time period equal to or longer than the first predetermined time period t1 (step ST9: Yes). Thus, the sunroof panel 5 and the sunshade panel 7 can be moved in the opening direction in one of the five different operation modes in the illustrated embodiment. Similarly, the sunroof panel 5 and the sunshade panel 7 can be moved in the closing direction in one of the five different operation modes (ST17, ST19, ST20, ST22, ST23) in the illustrated embodiment.

Thus, the sunroof panel 5 and the sunshade panel 7 can be operated in a variety of operation modes, and therefore, the operability of the vehicle roof device 1 can be improved while the structure of the switching unit 9 of the vehicle roof device 1 is simplified.

In the illustrated embodiment, when the opening operation signal is input (step ST1: Yes), the sunshade panel 7 is caused to begin moving in the opening direction with a higher priority than the sunroof panel 5 (step ST3: No, steps ST5 and ST7), and when the closing operation signal is input (step ST13: Yes), the sunroof panel 5 is caused to begin moving in the closing direction with a higher priority than the sunshade panel 7 (step ST15: No, steps ST17 and ST19), and therefore, an unfavorable situation where the sunroof panel 5 is open when the sunshade panel 7 is closed can be avoided.

Further, in the illustrated embodiment, when the sunshade panel 7 is not at the fully open position (ST3: No), it is possible to move only the sunshade panel 7 toward the fully open position in the automatic mode (step ST7) or to move both the sunshade panel 7 and the sunroof panel 5 toward the respective fully open positions in the automatic mode (step ST8) depending on the duration of the operation member 19 held at the opening operation position p2, and when the sunroof panel 5 is not at the fully closed position (ST16: No), it is possible to move only the sunroof panel 5 toward the fully closed position in the automatic mode (step ST19) or to move both the sunshade panel 7 and the sunroof panel 5 toward the respective fully closed positions in the automatic mode (step ST20) depending on the duration of the operation member 19 held at the closing operation position p3. This also improves the operability of the vehicle roof device 1.

In the illustrated embodiment, the sunroof panel 5 is configured to be tiltable, and the base member 18 of the switch unit 9 defines the tilting operation position p4 displaced upward from the neutral position p1. This allows the user to control not only the sliding movement of the sunroof panel 5 and the sunshade panel 7 in the opening and closing directions, but also the tilting movement of the sunroof panel 5 by operating the single switch unit 9 in an intuitive and easy manner, thereby contributing to improvement of the operability of the vehicle roof device 1.

Although the present invention has been described in terms of preferred embodiments thereof, it is obvious to a person skilled in the art that various alterations and modifications are possible without departing from the scope of the present invention which is set forth in the appended claims. For example, though in the illustrated embodiment the sunroof device 6 is of an inbuilt type and the sunroof panel 5 is tiltable, the sunroof panel 5 does not have to be configured to be tiltable and/or the sunroof device 6 may be of an outer slide type in which the sunroof panel 5 is slidable over the fixed roof 3. Further, though in the illustrated embodiment the sunshade electric motor 17 drives the sunshade panel 7 as a sunshade member that selectively opens and closes the roof opening 2, the sunshade member may include a flexible sheet member that can be wound around a shaft when moved to the fully open position. Also, the sunroof panel 5 may be replaced with a sunroof member of another type, such as a folding sunroof member made of fabric or the like. In the illustrated embodiment, the first and second predetermined time periods t1 and t2 serving as threshold time periods to be compared with the time period during which the opening operation signal is continuously input (or the duration of the operation member 19 held at the opening operation position p2) are respectively the same as the third and fourth predetermined time periods t3 and t4 serving as threshold time periods to be compared with the time period during which the closing operation signal is continuously input (the time periods t1 and t3 are both 2 seconds, and the time periods t2 and t4 are both 4 seconds). However, different threshold time periods may be set for the opening and closing operations.

An operation switch of the present invention does not have to be limited to the switch unit 9 mounted to the roof 2 and may include a remote control switch that communicates with the control unit 10 wirelessly.

Further, the operation signals output from the switch unit 9 to the control unit 10 may include any signal(s) capable of indicating positioning of the operation member 19 at the operation position p2, p3 or p4. For example, instead of outputting a continuous opening operation signal while the operation member 19 is positioned at the opening operation position p2 as in the illustrated embodiment, the switch unit 9 may output, upon movement of the operation member 19 is operated to the opening operation position p2, a first pulse signal indicating movement of the operation member 19 to the opening operation position p2, and output, when the operation member 19 is released and caused to move away from the opening operation position p2 under an urging force toward the neutral position p1, a second pulse signal indicating departure of the operation member 19 from the opening operation position p2, such that the control unit 10 can start counting the duration of the operation member 19 held at the opening operation position p2 when it receives the first pulse signal and reset the counted duration to zero when it receives the second pulse signal. In such a case, the first and second pulse signals serve as operation signals indicating positioning of the operation member 19 at the opening operation position p2. Similar pulse signals may be used to indicate positioning of the operation member 19 at another operation position p3 or p4.

In the illustrated embodiment, the control unit 10 is configured to control the sunroof device 6 to tilt up the sunroof panel 5 if the sunroof panel 5 is not at the tilt-up position (ST28: No) when the tilting operation signal is input, and to tilt down the sunroof panel 5 if the sunroof panel 5 is at the tilt-up position (ST28: Yes) when the tilting operation signal is input, so that the sunroof panel 5 is tilted up if the sunroof panel 5 is at a middle position between the fully closed position and the tilt-up position when the tilting operation signal is input to the control unit 10. However, it is possible in another embodiment that the control unit 10 is configured to control the sunroof device 6 to tilt down the sunroof panel 5 if the sunroof panel 5 is not at the fully closed position when the tilting operation signal is input, and to tilt up the sunroof panel 5 if the sunroof panel 5 is at the fully closed position when the tilting operation signal is input, so that the sunroof panel 5 is tilted down if the sunroof panel 5 is at a middle position between the fully closed position and the tilt-up position when the tilting operation signal is input to the control unit 10.

Further, though in the illustrated embodiment, the tilting movement of the sunroof panel 5 is controlled irrespective of the position of the sunshade panel 7, the control device 10 may be further configured to take into account the position of the sunshade panel 7 in controlling the tilting movement of the sunroof panel 5. For example, the control device 10 may be configured not to cause the sunroof device 6 to tilt up the sunroof panel 5 even when the tilting signal is input in the state where the sunroof panel 5 is at the fully closed position, if the sunshade panel 7 is at the fully closed position. Alternatively, the control device 10 may be configured to control the sunroof device 6 to tilt up the sunroof panel 5 and at the same time control the sunshade device 8 to move the sunshade panel 7 in the opening direction when the tilting signal is input in the state where each of the sunroof panel 5 and the sunshade panel 7 is at the fully closed position.

In the illustrated embodiment, the control unit 10 is configured to stop the movement of the sunroof panel 5 and/or the sunshade panel 7 in the opening direction when the operation member 19 is operated from the neutral position p1 to the closing operation position p3 during the movement of the sunroof panel 5 and/or the sunshade panel 7. However, the control unit 10 may be configured to stop the movement of the sunroof panel 5 and/or the sunshade panel 7 in the opening direction when the operation member 19 is operated from the neutral position p1 to the tilting operation position p4 during the movement of the sunroof panel 5 and/or the sunshade panel 7. Thus, the movement of the sunroof panel 5 and/or the sunshade panel 7 may be stopped in response to the movement of the operation member 19 to an operation position other than the opening operation position p2. Similarly, the movement of the sunroof panel 5 and/or the sunshade panel 7 in the closing direction may be stopped in response to the movement of the operation member 19 to an operation position other than the closing operation position p3.

It is also to be noted that not all of the component parts of the vehicle roof device 1 shown in the illustrated embodiment are necessarily indispensable, and they may be selectively used as appropriate for purposes.

The contents of the original Japanese patent application on which the Paris Convention priority claim is made for the present application as well as the contents of the prior art references mentioned in this application are incorporated in this application by reference.

The invention claimed is:

1. A vehicle roof device, comprising:
    a sunroof member driven by a sunroof electric motor to selectively expose and close a roof opening formed in a roof of a vehicle;
    a sunshade member disposed beneath the sunroof member and driven by a sunshade electric motor to selectively expose and close the roof opening;
    an operation switch including an operation member configured to be operated by a vehicle occupant, the operation member being movable between a neutral position, an opening operation position displaced from the neutral position in a first direction and a closing operation position displaced from the neutral position in a second direction different from the first direction; and
    a control unit configured such that, when the operation member is moved to one of the opening operation position and the closing operation position, the control unit controls the electric motors so as to drive the sunroof member and the sunshade member in an operation mode determined based on a relationship of a duration of the operation member held at the one of the opening operation position and the closing operation position with two different threshold time periods,
    wherein the two threshold time periods include a first predetermined time period and wherein in a case where the operation member has been held at the opening operation position for less than the first predetermined time period, when the sunshade member is not at a fully open position of the sunshade member, the control unit causes the sunshade electric motor to move the sunshade member toward the fully open position thereof only while the operation member is positioned at the opening operation position, and when the sunshade member is at the fully open position thereof, the control unit causes the sunroof electric motor to move the sunroof member toward a fully open position of the sunroof member only while the operation member is positioned at the opening operation position.

2. The vehicle roof device according to claim 1, wherein the two threshold time periods further include a second predetermined time period longer than the first predetermined time period and wherein in a case where the operation member has been held at the opening operation position for a time period equal to or longer than the first predetermined time period and less than the second predetermined time period, when the sunshade member is not at the fully open position thereof, the control unit causes the sunshade electric motor to move the sunshade member to the fully open position thereof even after the operation member is returned to the neutral position from the opening operation position, and when the sunshade member is at the fully open position thereof, the control unit causes the sunroof electric motor to move the sunroof member to the fully open position of the sunroof member even after the operation member is returned to the neutral position from the opening operation position.

3. The vehicle roof device according to claim 2, wherein in a case where the operation member has been held at the opening operation position for a time period equal to or longer than the second predetermined time period in a state where the sunshade member is not at the fully open position thereof, the control unit causes the sunshade electric motor and the sunroof electric motor to move both the sunshade member and the sunroof member to the respective fully open positions even after the operation member is returned to the neutral position from the opening operation position.

4. A vehicle roof device, comprising:
- a sunroof member driven by a sunroof electric motor to selectively expose and close a roof opening formed in a roof of a vehicle;
- a sunshade member disposed beneath the sunroof member and driven by a sunshade electric motor to selectively expose and close the roof opening;
- an operation switch including an operation member configured to be operated by a vehicle occupant, the operation member being movable between a neutral position, an opening operation position displaced from the neutral position in a first direction and a closing operation position displaced from the neutral position in a second direction different from the first direction; and
- a control unit configured such that, when the operation member is moved to one of the opening operation position and the closing operation position, the control unit controls the electric motors so as to drive the sunroof member and the sunshade member in an operation mode determined based on a relationship of a duration of the operation member held at the one of the opening operation position and the closing operation position with two different threshold time periods,
- wherein the two threshold time periods include a third predetermined time period and wherein in a case where the operation member has been held at the closing operation position for less than the third predetermined time period, when the sunroof member is not at a fully closed position of the sunroof member, the control unit causes the sunroof electric motor to move the sunroof member toward the fully closed position thereof only while the operation member is positioned at the closing operation position, and when the sunroof member is at the fully closed position thereof, the control unit causes the sunshade electric motor to move the sunshade member toward a fully closed position of the sunshade member only while the operation member is positioned at the closing operation position.

5. The vehicle roof device according to claim 4, wherein the two threshold time periods further include a fourth predetermined time period longer than the third predetermined time period and wherein in a case where the operation member has been held at the closing operation position for a time period equal to or longer than the third predetermined time period and less than the fourth predetermined time period, when the sunroof member is not at the fully closed position thereof, the control unit causes the sunroof electric motor to move the sunroof member to the fully closed position thereof even after the operation member is returned to the neutral position from the closing operation position, and when the sunroof member is at the fully closed position thereof, the control unit causes the sunshade electric motor to move the sunshade member to the fully closed position of the sunshade member even after the operation member is returned to the neutral position from the closing operation position.

6. The vehicle roof device according to claim 5, wherein in a case where the operation member has been held at the closing operation position for a time period equal to or longer than the fourth predetermined time period in a state where the sunroof member is not at the fully closed position thereof, the control unit causes the sunshade electric motor and the sunroof electric motor to move both the sunshade member and the sunroof member to the respective fully closed positions even after the operation member is returned to the neutral position from the closing operation position.

7. The vehicle roof device according to claim 1, further comprising a tilting mechanism for tilting up and down the sunroof member, wherein:
- the operation member further has a tilting operation position displaced from the neutral position in a direction different from the first direction and the second direction; and
- the control unit is further configured to, when the operation member is moved to the tilting operation position, control the tilting mechanism to tilt up or down the sunroof member depending on a position of the sunroof member in a tilting direction.

8. The vehicle roof device according to claim 1, wherein the operation switch is configured to define only a single operation position of the operation member in each of the first and second directions.

9. The vehicle roof device according to claim 4, further comprising a tilting mechanism for tilting up and down the sunroof member, wherein:
- the operation member further has a tilting operation position displaced from the neutral position in a direction different from the first direction and the second direction; and
- the control unit is further configured to, when the operation member is moved to the tilting operation position, control the tilting mechanism to tilt up or down the sunroof member depending on a position of the sunroof member in a tilting direction.

10. The vehicle roof device according to claim 4, wherein the operation switch is configured to define only a single operation position of the operation member in each of the first and second directions.

* * * * *